United States Patent [19]

Hayner et al.

[11] 4,050,476

[45] Sept. 27, 1977

[54] LOW NOISE HYDRAULIC SERVO VALVE

[75] Inventors: Paul F. Hayner, Lexington, Mass.; David G. Eldridge, Nashua, N.H.; Edgar R. Bernier, Nashua, N.H.; Richard B. Henderson, Nashua, N.H.

[73] Assignee: Sanders Associates, Inc., Nashua, N.H.

[21] Appl. No.: 277,455

[22] Filed: July 10, 1972

Related U.S. Application Data

[63] Continuation of Ser. No. 93,308, Nov. 27, 1970, abandoned.

[51] Int. Cl.[2] ..................... F15B 13/042; F16K 11/07

[52] U.S. Cl. ................................ 137/625.62; 91/466; 137/625.63; 137/625.66; 137/625.69; 138/41; 138/42

[58] Field of Search ...................... 137/625.65, 625.67, 137/625.69, 625.62, 625.63, 625.66; 91/466, 462, 464; 138/41, 42

[56] References Cited

U.S. PATENT DOCUMENTS

| | | | |
|---|---|---|---|
| 1,899,251 | 2/1933 | Zerk | 138/41 |
| 2,021,079 | 11/1935 | Mittendorf et al. | 138/42 |
| 2,517,061 | 8/1950 | Von Stackelberg | 137/625.25 X |
| 2,584,127 | 2/1952 | Harcum et al. | 91/466 X |
| 2,635,641 | 4/1953 | Kasten | 138/41 X |
| 3,221,770 | 12/1955 | Faisandier | 91/466 X |
| 3,402,553 | 9/1968 | Mercier | 91/462 X |
| 3,434,500 | 3/1969 | Burrows | 138/42 |
| 3,473,324 | 10/1969 | Mercier | 91/466 X |
| 3,542,075 | 11/1970 | Kroth | 137/625.69 |

*Primary Examiner*—Irwin C. Cohen
*Attorney, Agent, or Firm*—Louis Etlinger; William L. Hunter

[57] ABSTRACT

A fluid flow control valve which includes a body formed to define a chamber having inlet, outlet and actuating ports for supplying and receiving fluid to and from external hydraulic machinery to be actuated and including a valve spool formed with several lands and slidably arranged in the chamber for controlling the flow of fluid through the ports, in which the lands and ports are located and arranged so that some of said ports transmit fluid only from said chamber outward while the remainder of the ports transmit fluid only from the ports into the chamber, and which also includes a matrix of restrictors interposed in each of those ports which transmits fluid outward from the chamber, and in which the lands are arranged to control the flow of fluid through only those ports which transmit fluid outward while leaving the flow of fluid into the chamber through the remaining ports unimpeded for all positions of the spool.

2 Claims, 3 Drawing Figures

LOW NOISE HYDRAULIC SERVO VALVE

FIELD OF THE INVENTION

This invention relates generally to hydraulic valves which control the flow of fluid under pressure to and from a load device and particularly to such valves which are unusually quiet in operation and in which the rate of erosion of the lands is unusually low.

BACKGROUND

A typical prior art flow control valve includes a block formed with a cylindrical bore containing a piston or spool having several enlarged diameter portions or lands engaging the cylindrical bore and connected by smaller diameter portions. The block is formed with a number of passageways or ports in communication with the interior of the bore at various places along its length and adapted to be connected exteriorly of the valve to (1) a supply of fluid under pressure, (2) a fluid return line or reservoir, and (3) first and second conduits leading to opposite sides of a load device such as a hydraulic ram. When the spool is in its neutral position, the lands occlude some or all of the ports in such a way that no fluid flows through the valve. In operation, the spool is displaced axially to one side or the other of its neutral position by an external force, for example, by a pilot valve. When so displaced, the lands partially or fully expose certain ports in such a fashion that the fluid under pressure flows into one of the load conduits while fluid from the other load conduit flows through the valve to the return line. As the spool is first displaced a short distance from its neutral position, fluid flows from a relatively high pressure area through the small orifice adjacent to the rim of the land to a relatively low pressure region having the relatively large volume of either the cylindrical bore adjacent to a reduced diameter portion of the spool or to one of the ports in the block, depending upon the direction of flow. In either case, the flow through the small orifice into the large volume at low pressure results in high velocity and high turbulence. These conditions in turn cause a high noise level and rapid erosion of the edge of the land.

It is a general object of the present invention to provide an improved fluid-flow control valve.

Another object of the invention is to provide a fluid-flow control valve which is very quiet in operation.

Another object of the invention is to provide a fluid-flow control valve having a very long life.

A more specific object of the invention is to provide a fluid-flow control valve in which the flow of fluid is controlled without generating high fluid velocities with the result that the valve operates very quietly and exhibits an especially low rate of erosion of the lands.

SUMMARY OF THE INVENTION

Briefly stated, a valve incorporating the invention is constructed so that the flow past each land is always into a restrictor matrix of a particular kind in which the cross sectional area of flow increases in the direction of flow and in which the displacement of the spool to allow an increase in the rate of flow successively exposes additional restrictors. This arrangement prevents the generation of high velocities with its resulting problems.

BRIEF DESCRIPTION OF THE DRAWINGS

For a clearer understanding of the invention, reference may be made to the following detailed description and the accompanying drawing in which.

DESCRIPTION OF THE PREFERRED EMBODIMENT

Figure 1:
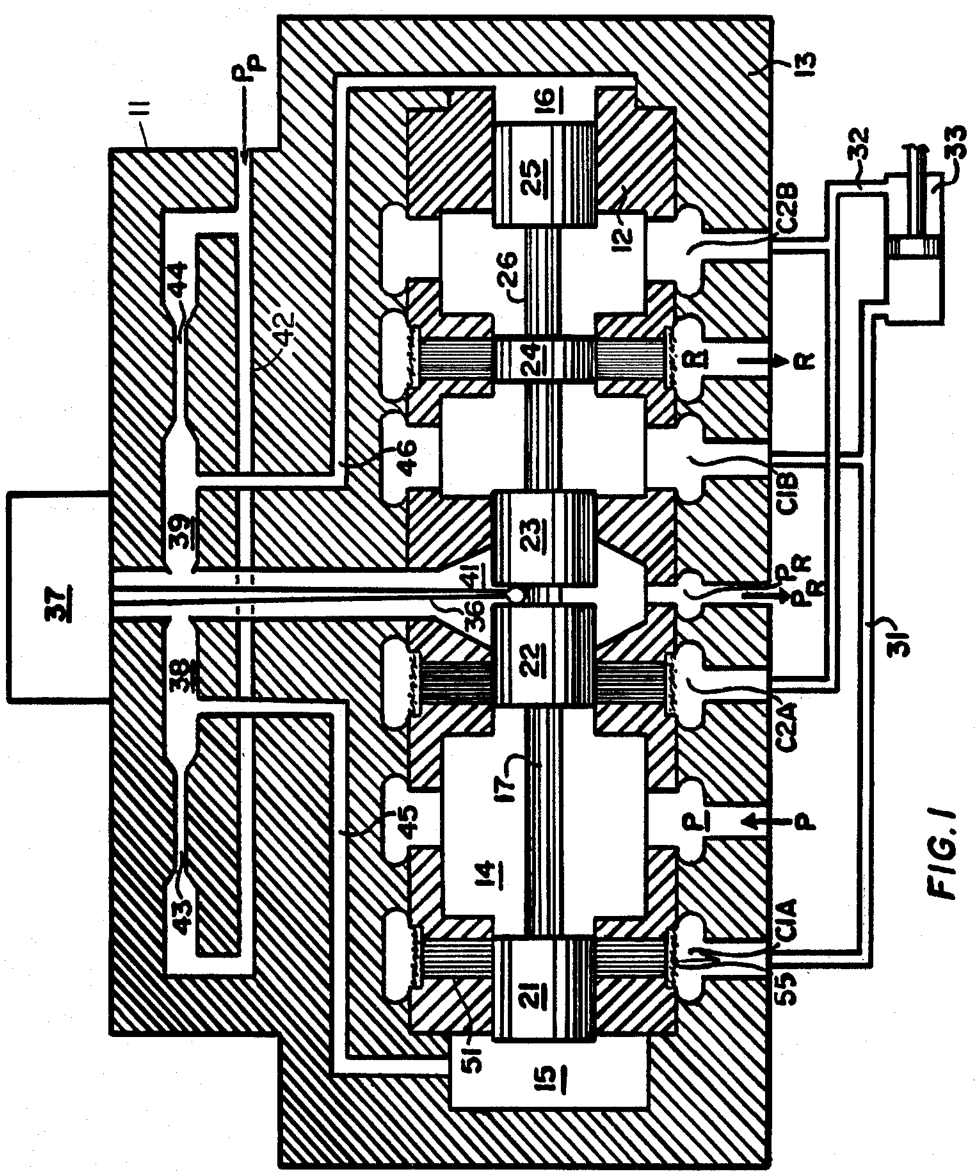
FIG. 1 is a schematic cross section view of a fluid flow control valve incorporating the invention.

Referring first to FIG. 1, a valve body is shown generally by the reference character 11 and may comprise, for example, a sleeve 12 and a block 13. It is understood that this figure is partly schematic and that the valve may be made of fewer or more parts than those actually shown. It is also understood that certain parts have been omitted such as bolts, gaskets, and the like.

As shown, the valve body 11 is formed with a chamber, denoted generally by the reference character 14, including opposite end spaces 15 and 16. Between these end spaces the chamber includes small and large diameter cylindrical portions as shown. Within the chamber is a valve spool, indicated generally by the reference character 17, which comprises lands 21, 22, 23, 24 and 25, interconnected by smaller diameter rod like portions, such as the portion 26. These lands have a suitable diameter to closely engage the walls of the smaller diameter cylindrical portions of the chamber 14. The valve body 11 is also formed with a number of ports, each communicating with the interior of the chamber, and each extending entirely or at least for a considerable portion of the distance around the circumference of the chamber 14. The port P is the inlet port and is connected to a source (not shown) of fluid under pressure. The port R is the outlet port and is connected to a return line, or reservoir. The ports ClA and ClB are connected together and also connected to a first conduit 31. The ports C2A and C2B are connected to each other and to a second conduit 32. These two conduits are connected to opposite terminals of a load device such as a hydraulic ram 33. It is apparant that as fluid flows through the conduit 31 to the ram 33, and from the ram 33 into the conduit 32, the load will move one direction while as fluid flows from conduit 32 to the ram 33, out of the ram 33 and into the conduit 31, then the load will be moved in the opposite direction.

The port C1A communicates with the chamber 14 in the region of the land 21 by which it is completely occluded when the spool 17 is in the neutral position shown in FIG. 1. The port P communicates with the chamber 14 in the region between the lands 21 annd 22, and is completely exposed for all positions of spool 17. In this region the chamber 14 is of enlarged diameter as previously mentioned. Such an enlarged diameter portion is not strictly necessary for operation of the valve but is preferred at present.

The port C2A communicates with the chamber in the region of the land 22 by which it is completely occluded in the neutral position shown. The port C1B communicates with another one of the larger diameter portions of the chamber 14 between the lands 23 and 24, and is completely open at all times. The port R communicates with the chamber in the region of land 24 by which it is completely occluded in the neutral position shown in FIG. 1. The port C2B also communicates with one of the larger diameter portions of the chamber located between lands 24 and 25 and also is completely open for all positions of the spool 17.

The spool 17 is axially positioned by means of a conventional first stage valve which includes a flapper, or wand, 36, which extends from a force motor 37 between the two nozzles 38 and 39, through a channel 41 formed in the valve body 11, to the spool 17, where it is fastened between the lands 22 and 23. The channel 41 communicates through a port $P_r$ with the pilot returnline. A source of pilot pressure denoted $P_p$ is connected to a conduit 42 and through two restrictors, 43 and 44, to the nozzles 38 and 39, respectively. Conduits 45 and 46 lead from points adjacent to nozzles 38 and 39, to the end spaces 15 and 16, respectively.

To consider the operation, it is first to be noted that, in the neutral position of the spool 17 shown in the drawing, no fluid flows through the valve. Although the pressure port P is open, fluid cannot flow because the lands 21 and 22 occlude the ports C1A and C2A. Similarly, although the ports C1B and C2B are also open, no fluid can flow to or from the ram 33 because the land 24 occludes the return port R.

When the ram 33 is to be actuated, a signal is applied to the force motor 37 which displaces the wand 36 thereby establishing a pressure differential between the end spaces 15 and 16, which then displaces the spool 17, all in a well known manner. Assuming that the spool 17 is displaced slightly to the left, fluid will then enter the chamber 14 from the port P and flow past the land 21 and through the port C1A to the conduit 31. No fluid can flow into the chamber through the port C1B because the land 24 blocks the flow from this portion of the chamber to the return port R. However, fluid can and does flow from the ram 33 through the conduit 32 and the port C2B into the chamber 14 and thence out of the chamber 14 through the port R. Similarly, if the spool 17 be displaced to the right, fluid will flow into the chamber 14 from the port P then into the port C2A, the conduit 32, and the ram 33. Fluid will also flow from the ram 33 through the conduit 31 and the port C1B into the chamber 14 and then out through the return port R.

It is to be noted that the fluid flowing in the ports C1A, C2A, and R is always in the direction from the chamber 14 through these ports to external apparatus. Similarly, it is to be noted that the fluid flow through ports P, C1B, and C2B, is always in the direction from external apparatus through these ports and into the chamber 14. It is also to be noted that these latter three ports are always completely exposed and that the fluid flows therethrough unimpeded. In other words, the flow of fluid through any port is always in the same direction rather than sometimes being in one direction and sometimes in the opposite.

Figure 2:
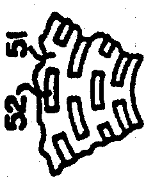
FIG. 2 is a fragmentary plan view of a portion of one of the restrictor plates shown in FIG. 1.
Figure 3:
FIG. 3 is a fragmentary cross section view of a portion of two of the restrictor plates shown in FIG. 1.

The above discussed arrangement or ports, with its single direction of flow for each port, makes it possible to prevent the generation of high fluid velocities. Placed within each of the ports C1A, C2A and R is a restrictor matrix of a kind comprising many passageways and having an increasing cross sectional flow area in a radially outward direction. Additionally, the matrix is arranged so that additional restrictors are exposed as the associated land moves to allow a greater rate of flow. Such a restrictor matrix could, for example, be a series of holes or long tubes, but at present it is preferred that the matrix comprise a plurality of plates formed with baffles on one side. As best shown in FIGS. 2 and 3, each of the plates 51 is formed with a plurality of baffles 52 on one surface. These may conveniently be formed by etching techniques. The plates are stacked one upon another and brazed together along the tops of the baffles 52. This arrangement of plates in of itself is not a part of the present invention but is more fully described and claimed in the copending application of Paul F. Hayner and Richard J. Brockway for FLUID FLOW RESTRICTOR, Ser. No. 93,192 filed Nov. 27, 1970, which application is assigned to the same assignee as the instant application and has now matured into U.S. Pat. No. 3,688,800. It is sufficient for present purposes to ntoe that as the spool first moves, each of the lands 21, 22, and 24 first exposes the passageways between the nearest pair of adjacent plates. The fluid flows radially outward through an increasingly large cross sectional area of flow. The arrangements of baffles as shown in FIGS. 2 and 3 provides a series of restrictions so that the fluid can flow from the central bore radially outward and in so doing has its velocity reduced in a series of small steps as it encounters and passes through the various restrictions caused by the adjacent baffles. It has been found that such an arrangement of baffled plates is very effective in reducing the noise of operation of a valve, principally because there is not sufficient pressure drop across any one passageway to produce noise, cavitation, or erosion. The minute turbulence involved is quickly dissipated in shear losses in the fluid, that is, in heating the fluid. It is also to be noted that as more flow is called for, the lands 21, 22, and 24 expose additional passageways between additional pairs of plates.

It has also been found helpful in some valves to place one or more layers of wire mesh, such as is shown at 55, around the outer edges of each of these stacks of plates. This can be done conveniently by simply winding a layer, or several layers, around the outside of the stack.

The particular valve shown and described for illustrative purposes is one in which, at the neutral position, each metering land just closes its associated port so that there is no flow of fluid through the valve yet, there is little or no dead space. It is apparent that this construction is merely illustrative and that the invention is also applicable to valves in which the lands are substantially overlapped, to obtain a predetermined dead space, and to valves in which the lands are underlapped to provide an open center valve having a predetermined rate of flow through the valve at neutral.

In summary, it is to be noted that the ports and the lands are so arranged so that the flow of fluid through each port is always in the same direction. Some of the ports carry fluid flowing into the chamber while other ports carry fluid flowing out of the chamber. The various lands control the flow through those ports which carry fluid from the chamber outward. In each of these controlled ports, there is a restrictor matrix which reduces the pressure gradually, thereby preventing the generation of high fluid velocities. Since no fluid flows at high velocity across the edges of the lands controlling these ports, the lands do not wear rapidly and the valve has a long life. Similarly, the absence of high velocity fluid makes for very quiet operation.

Although a specific embodiment of the invention has been described in considerable detail for illustrative purposes, many modifications can be made within the spirit of the invention. It is therefore desired that the protection afforded by Letters Patent be limited only by the true scope of the appended claims.

What is claimed is:

1. A valve for controlling the flow of fluid from a source of fluid under pressure to a load and from said load to a return, including a valve body formed to define an interior chamber having ports communicating with said chamber for connection to said source, to said return and to first and second load conduits and including a valve spool having lands positioned relative to each other and to said ports so as to define a neutral position at which the flow of fluid from said source to said load and from said load to said return is blocked and also positioned so that upon displacement of said spool from said neutral position flow of fluid from said source to said load and from said load to said return is initiated in a sense and an amount determined by the direction and magnitude of such displacement, characterized in that said lands and said ports are also relatively positioned and said ports are adapted to be connected to said source, said return and said first and second load conduits so that, when connected, pressure differentials are established such that through any one port fluid tends to flow in but one direction, never tending to flow in the reverse direction and so that in said neutral position said lands block only those ports through which fluid tends to flow in the direction from said chamber to said ports, while displacement from said neutral position variably unblocks selected ones of said same ports as said spool is displaced in one or the other direction, leaving completely unblocked for all operative positions of said spool those ports across which the pressure differentials are such that fluid tends to flow from said ports into said chamber, and further characterized in that a restrictor matrix is included in each of those ports which is blocked by a land when said spool is in said neutral position, each of said restrictor matrices comprising a plurality of plates, each formed with a central bore having a diameter to form a sliding fit with said lands, and each formed with a plurality of raised baffles on one side thereof, said plates being positioned coaxially to form a stack having a central bore and defining a plurality of restrictive passages between each pair of adjacent plates for the passage of fluid radially outwardly.

2. A valve in accordance with claim 1 in which the outer surface of said stack of plates is covered with a layer of wire mesh.

* * * * *